United States Patent [19]

Amery

[11] 3,969,757

[45] July 13, 1976

[54] COLOR IMAGE SIGNAL PROCESSING CIRCUITS

[75] Inventor: John Gordon Amery, Indianapolis, Ind.

[73] Assignee: RCA Corporation, New York, N.Y.

[22] Filed: Apr. 21, 1975

[21] Appl. No.: 570,325

[52] U.S. Cl. .................................. 358/4; 358/31
[51] Int. Cl.² ..................... H04N 5/76; H04N 9/535
[58] Field of Search .................. 358/4, 31, 8, 39

[56] References Cited
UNITED STATES PATENTS

| | | | |
|---|---|---|---|
| 3,871,020 | 3/1975 | Wilber | 358/8 |
| 3,872,497 | 3/1975 | Amery et al. | 358/31 |

*Primary Examiner*—Benedict V. Safourek
*Assistant Examiner*—R. John Godfrey
*Attorney, Agent, or Firm*—E. M. Whitacre; William H. Meagher

[57] ABSTRACT

Circuits are disclosed for processing color encoded video signals, encoded per a format wherein a chrominance signal in the form of a modulated subcarrier is buried in spectrum "troughs" in the midband of a wider band luminance signal, an illustrative use of the encoding format being in video disc recording. The processing circuits serve, in use with composite signals developed during video disc playback, to convert an input composite signal of buried subcarrier format to an output composite signal of NTSC format. Carrier waves are amplitude modulated in accordance with composite signals developed during video disc playback, and applied to the input of a 1H delay line. Subtractive combination of the modulated carrier waves from both input and output of the delay line effects a first comb filtering action to develop a chrominance signal output in the highband location desired for output use. The delay line output is applied to an amplitude detector. The detected signal is additively combined with the input composite signal to effect a second comb filtering action, developing a luminance signal output free of chrominance components and also lacking vertical detail components. A phase inverted version of the detected signal is also additively combined with the input composite signal to effect a third comb filtering action, and the sum is low pass filtered to provide a vertical detail signal. Combining of the products of the three comb filters provides the output composite signal. The output of the amplitude detector is also used as a substitution signal input to the carrier wave modulator under defect pickup conditions.

4 Claims, 1 Drawing Figure

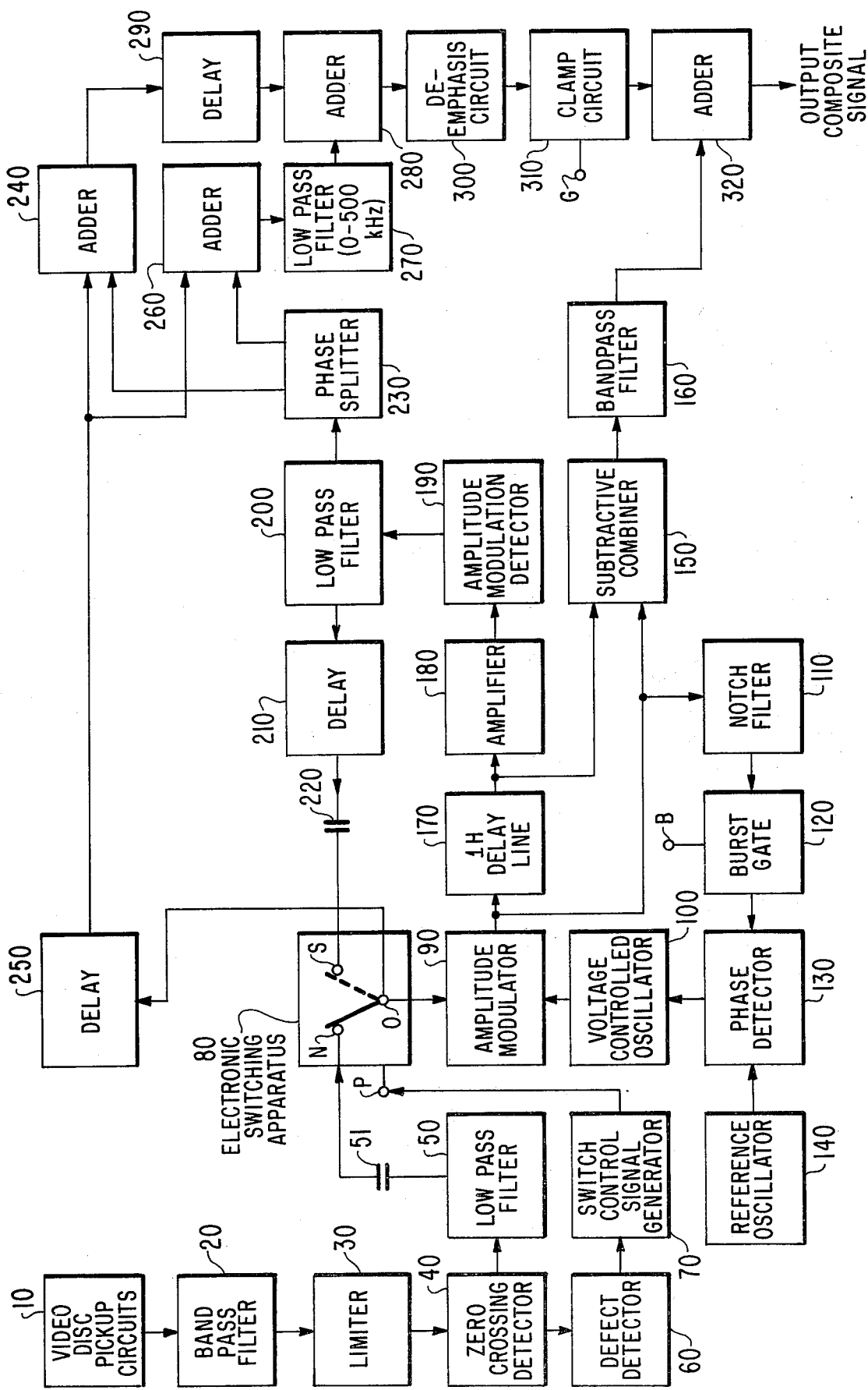

COLOR IMAGE SIGNAL PROCESSING CIRCUITS

The present invention relates generally to color image signal processing circuits, and particularly to processing circuit suitable for converting an input composite signal of one encoding format (used, for example, in a video disc recording) to an output composite signal of another encoding format (useful, for example, for application to a color television receiver).

In U.S. Pat. No. 3,872,498, issued on Mar. 18, 1975 to Dalton H. Pritchard, a color encoding format is disclosed wherein a chrominance signal in the form of a modulated subcarrier is "buried" in the midband of a wider band luminance signal. Comb filtering of the luminance signal midband prepares "troughs" in the luminance signal frequency spectrum. The chrominance signal is subject to complementary comb filtering to confine it to components falling in the vacated troughs of the luminance signal frequency spectrum. An illustratives use of this encoding format is in video disc recording. The copending U.S. Pat. No. 3,842,194, issued to Jon K. Clemens on Oct. 15, 1974, describes a variable capacitance video disc system which is illustrative of disc systems in which the buried subcarrier encoding format may be advantageously employed.

In one contemplated form of player apparatus for a video disc record, the player apparatus does not incorporate image display equipment but rather serves as a form of attachment or auxiliary equipment for use with a separate color television receiver (the image display equipment of the latter serving for display of the recorded color image information). In such a player attachment, it is desirable that an output composite signal be developed that appears in the format (e.g., the NTSC format) which the color television receiver is designed to handle. Thus, for player attachments usable with video disc records employing the buried subcarrier format, it is desirable to provide the player with means for converting an input composite signal of buried subcarrier format to an output composite signal of a different encoding format (e.g., NTSC format) compatible with the color television receiver processing circuitry design. Of course, such conversion apparatus may also be desirably employed in other forms of video disc player apparatus, such as one of the combination type, where a single unit incorporates both color video disc playing equipment and broadcast color television receiving equipment and the economy inhering in use of common color decoding equipment for both disc and broadcast signals dictates the desirability of disc signal conversion.

In U.S. Pat. No. 3,872,497, issued on Mar, 18, 1975 to J. G. Amery, et al., it is noted that in video disc playback operations, one may encounter, for a variety of reasons, undesired variations of the speed of relative motion between the pickup stylus and the record groove that may result in spurious variations of the recovered signal frequencies. Thus, for example, the color subcarrier sideband frequencies in a recovered composite signal of the "buried subcarrier" type may be subject to "jitter" about their otherwise expected locations in the frequency spectrum, with the accompanying luminance signal component frequency locations subject to a similar jitter.

The aforesaid jitter of signal frequencies recovered in disc playback poses a problem for one seeking to transcode the recovered signals from buried subcarrier format to another format compatible with color television receiver circuitry. While comb filtering of the midband portion of the recovered signals may permit accurate separation of the interleaved luminance and chrominance signal components when the frequency stability of the recovered signals is assured, the presence of "jitter" can jeopardize attainment of the requisite accuracy of separation. A solution to the jitter sensitivity problems is described in the aforesaid Amery, et al. patent, wherein heterodyning of the recovered buried subcarrier composite signal (or a portion thereof) with local oscillations precedes comb filtering; and, the source of local oscillations is caused to have substantially the same "jitter" as the recovered signal components (e.g., by rendering the local oscillation source responsive to the frequency variations suffered by the color synchronizing component which accompanies the buried subcarrier chrominance signal). The product of heterodyning with such local oscillations is substantially jitter-free; comb filtering of the product may be carried out with a single 1H delay line form of comb filter with crosstalk freedom relatively independent of the original "jitter."

By appropriate choice of the nominal frequency of the local oscillations, the heterodyning step that effects jitter stabilization may also serve to shift the chrominance signal from its midband location in the input (buried subcarrier) format to the highband location desired for the output (e.g., NTSC) format, whereby subsequent comb filtering (in the highband spectral region) to eliminate luminance signal components provides a highband chrominance signal for direct inclusion in an output composite signal.

The comb filter system arrangements in the aforesaid Amery, et al. patent permit achievement of the desired composite signal transcoding with a single 1H delay line of a relatively inexpensive, commercially available form. The present invention is directed to improved arrangements for such transcoding apparatus, which retain the advantage of inexpensive delay line use while alleviating practical problems associated with the characteristics of such devices.

In accordance with an illustrative embodiment of the present invention, composite video signals of the aforesaid buried subcarrier format are recovered by playback of a video disc and are applied to an amplitude modulator, also receiving carrier waves that "jitter" about a nominal value (corresponding to the sum of the buried color subcarrier frequency and the desired output color subcarrier frequency) in consonance with the "jitter" if any, of the recovered signals. The modulator output is applied to the input of a 1H delay line. The subtractive combination of the modulated carrier waves from both the input and the output of the delay line, followed by suitable bandpass filtering, provides a highband chrominance signal output, combed free of luminance components.

In further accordance with said illustrative embodiment, the delay line output is applied to an amplitude modulation detector. The detector output is additively combined with the input composite signal to obtain luminance signal components, combed free of chrominance signal components. A phase inverted version of the detector output is also added to the input composite signal, and the sum is applied to a low pass filter to obtain a vertical detail signal. Combination of the vertical detail signal with the other combed luminance signal components develops the output luminance signal, which is added to the combed highband chrominance signal to form the desired output composite signal. The described manner of forming the output luminance signals ensures the presence of adequate vertical detail in images reproduced in response to the composite output, while suppressing spurious luminance components (arising as a consequence of ripples in the delay line's frequency response characteristic, as will be explained subsequently).

Use of the aforesaid illustrative embodiment also facilitates use of an advantageous form of defect compensation. To this end, the output of the aforesaid amplitude modulation detector conveniently serves as substitution signal input to the aforesaid amplitude modulator under defect pickup conditions.

Objects and advantages of the present invention will be readily recognized by those skilled in the art upon a reading of the following detailed description, and an inspection of the accompanying drawing which provides a block diagram illustration of video disc player apparatus including signal processing circuits in accordance with an illustrative embodiment of the present invention.

In the video disc player apparatus of the drawing, a recorded signal is recovered during playback of a video disc by video disc pickup circuit 10. Illustratively, the video disc pickup system is of the capacitive type previously described, and the structure and circuit arrangement of the video disc pickup circuits may be, for example, as described in U.S. Pat. No. 3,872,240, issued to D. J. Carlson, et al. on Mar. 18, 1975. It is asssumed that the recording format for the disc is such that the recovered signal information includes a frequency modulated picture carrier, the instantaneous carrier frequency deviating within fixed deviation range limits (e.g., 3.9 – 6.5 MHz) in accordance with the amplitude of a composite video signal occupying a band of frequencies (e.g., 0 – 3 MHz) below the deviation range, and representative of a succession of color images to be displayed.

A bandpass filter 20, having a pass band encompassing the picture carrier deviation range and appropriate sidebands thereof, selectively passes the frequency modulated picture carrier signal to a limiter 30 (serving the conventional purpose of removing or reducing spurious amplitude modulation of the input FM signal. The limiter output is applied to a zero-crossing detector 40. The zero-crossing detector may comprise circuits of well-kmown type for developing an output pulse of a fixed amplitude, width and polarity in response to each zero-crossing of the limited input FM signal. The pulse output of the zero-crossing detector 40 is supplied to a low pass filter 50, having a pass band substantially matching the band (e.g., 0 – 3 MHz) occupied by the recorded video signal information.

The zero-crossing detector 40 and low pass filter 50 form an FM detector of a so-called pulse counter type, providing an output in the form of a composite video signal corresponding to the modulation of the input FM signal. Illustratively, the video signal information recovered from the disc comprises a composite color video signal encoded in a "buried subcarrier" format, as disclosed in U.S. Pat. No. 3,872,498, issued on Mar. 18, 1975 to Dalton H. Pritchard.

For purposes of illustration, the following parameters may be assumed to be descriptive of the buried subcarrier form of the recorded composite color video signal: (1) Color subcarrier frequency $(f_b) = 195/2\ f_H$, or approximately 1.53 MHz, when the line frequency $(f_H)$ corresponds to the U.S. standard for color television broadcasting; (2) Chrominance signal: sum of respective quadrature related subcarrier phases respectively amplitude modulated with red and blue color difference signal (R-Y, B-Y) of 0 – 500 KHz bandwidth, with equal bandwidth (500 KHz) upper and lower sidebands preserved (and carrier suppressed); (3) Luminance signal (Y) bandwidth: 0 – 3 MHz; (4) Color synchronizing component: burst of oscillations at buried subcarrier frequency $(f_b)$ of reference phase and amplitude, during horizontal blanking "backporch" (corresponding to standard NTSC color synchronizing component in all but frequency).

Also responding to an output of the zero-crossing detector 40 is a defect detector 60, which may, illustratively, be of the type shown in the copending U.S. Pat. application of Jon K. Clemens, et al., Ser. No. 477,102, filed on June 6, 1974 now abandoned. The defect detector 60 serves to detect randomly occurring disturbances of the input FM signal, that tend to produce white and/or black spots and streaks supplanting the appropriate picture information in reproductions of the recorded images. Defect indication pulses developed by the defect detector 60 are supplied to a switch control signal generator 70, which develops signals for controlling the switching state of electronic switching apparatus 80. Reference may be made to the copending U.S. Pat. application of A. L. Baker, Ser. No. 477,103, filed June 60, 1974, now U.S. Pat. No. 3,909,518 for a detailed description of suitable apparatus for performing the functions of generator 70 and switching apparatus 80.

Electronic switching apparatus 80 serves the purpose of alternatively: (1) completing a signal path between a "normal" signal input terminal N and the switching apparatus output terminal O, or (2) completing a signal path between a "substitution" signal input terminal S and the output terminal O. Switching between the respective "normal" and "substitution" states is controlled by the output of switch control signal generator 70, which is applied to the control signal input terminal P of the switching apparatus 80.

The output terminal O of the switching apparatus 80 is coupled to the modulating signal input terminal of an amplitude modulator 90. The "normal" input signal to the switching apparatus 80 (i.e., the signal applied to terminal N, and conveyed therefrom to the modulating signal input terminal of modulator 90 during the normal mode of operation of the video disc player) is the composite video signal output of low pass filter 50 (coupled via capacitor 51 to terminal N). The "substitution" input signal (i.e., the signal applied to terminal S, and conveyed therefrom to the modulating signal input terminal of modulator 90 during a defect masking, or "substitution," mode of operation of the player) is a delayed composite video signal derived in a manner to be subsequently described.

Amplitude modulator 90 serves to modulate the amplitude of carrier waves, supplied by a voltage controlled oscillator 100, in accordance with the signals delivered from the switching apparatus output terminal O. Amplitude modulator 90 is desirably of the singly balanced type (balanced against the modulating signal) and provides less than a maximum percentage of modulation of the carrier waves. The normal frequency $(f_c)$ of the carrier waves supplied by oscillator 100 corresponds to the sum of the buried subcarrier frequency $(f_b)$ and the desired output subcarrier frequency $(f_o)$, and illustratively corresponds to $325f_H$, or approximately 5.11 MHz (for the instance where the desired output subcarrier frequency corresponds to the NTSC subcarrier frequency of $455/2f_H$, or approximately 3.58 MHz). Illustratively, oscillator 100 is a voltage controlled crystal oscillator such as is shown in the copending U.S. Pat. application of T. Burrus, Ser. No. 522,816, filed on Nov. 12, 1974.

Desirably, the frequency of the carrier waves developed by oscillator 100 varies about the aforesaid nominal frequency in consonance with the "jitter" of the frequencies of the composite video signal recovered during record playback. For this purpose, the voltage controlled oscillator 100 is associated with control circuitry in an arrangement forming a phase locked loop system, such as disclosed in the aforesaid Amery, et al. patent.

In the control arrangement of the herein illustrated video disc player apparatus, the output frequency of oscillator 100 is controlled by the output of a phase detector 130, which compares in phase the color synchronizing component recovered from the record, and the output of a reference oscillator 140. Reference oscillator 140 operates at the desired output subcarrier frequency ($f_o$), and is desirably crystal controlled. The color synchronizing component is supplied by a burst gate 120, which responds to an output of amplitude modulator 90 supplied via a notch filter 110. Notch filter 110 bars passage of the relatively large amplitude carrier component in the modulator output.

Burst gate 120 desirably incorporates bandpass filter circuitry confining its response to frequencies in the output chrominance band about the output subcarrier frequency ($f_o$). Controlled by suitably timed, line frequency, gating pulses applied at gating terminal B, the burst gate 120 selectively passes the filtered output of modulator 90 appearing during the "backporch" interval occupied by the color synchronizing component. The output of burst gate 120 comprises periodic bursts of oscillations which will nominally be at the output subcarrier frequency, the synchronizing bursts falling at that frequency in the lower sideband of the output of modulator 90.

The closed loop system formed in the manner described immediately above functions to hold the synchronizing burst component in the lower sideband of the output of modulator 90 in frequency (and phase) synchronism with the highly stable output of reference oscillator 140. As jitter of the recovered composite video signal occurs, tending to cause a departure from such synchronism, the control voltage output of phase detector 130 produces a compensating adjustment of the output frequency of oscillator 100 to oppose such departure.

The amplitude modulated carrier wave output of modulator 90 is applied to the input of a 1H delay line 170. The delay line 170, providing a delay substantially corresponding to a period at the nominal line frequency ($f_H$), may illustratively comprise a glass delay line of the Amperex DL56 type. By suitable selection of the parameters of the delay line input and output terminations, the passband of such delay line may be readily adjusted to accommodate a band of frequencies extending from slightly above $f_c$ (e.g., 5.11 MHz) to slightly below the lowest color sideband frequency (e.g., $f_o$ - 500 KHz, or 3.08 MHz) for the output color subcarrier.

Signals from both the input and output of delay line 170 are applied to a subtractive combiner 150. The delay line terminal selections are such that the subtractive combination of the signals derived therefrom produces a comb filtering action of a type permitting chrominance component passage. The frequency response characteristic of the comb filter thus realized has (over a frequency band corresponding to the passband of delay line 170) a succession of rejection notches at even multiples of half the line frequency ($f_H$) and an interleaved succession of response peaks at odd multiples of half the line frequency. The output of combiner 150 is applied to a band pass filter 160, having a passband centered about the desired output color subcarrier frequency ($f_o$), with a bandwidth substantially matching the output chrominance component band (e.g., 3.08 – 4.08 MHz). The output of filter 160 is thus a separated chrominance component in the highband location desired for output use, suitable for application to an output composite signal forming circuit, constituted by an adder 320.

For an explanation of the derivation of the luminance component input to adder 320, it is necessary to consider the operation of further circuitry responsive to the output of delay line 170. An amplifier 180 supplies an amplified version of an output of the 1H delay line 170 to an amplitude modulation detector 190, which recovers a composite video signal from the amplitude modulated carrier waves by delay line 170. A low pass filter 200 is coupled to the output of detector 190, and has a cutoff frequency chosen to block passage of carrier and sideband components from the output of detector 190. To reduce the filtering requirements, so that relatively little signal delay need be introduced by low pass filter 200, it is desirable to choose a full wave rectifying form of envelope detector as detector 190, so that significant levels of carrier and sideband components primarily appear only at doubled frequencies (e.g., around 10.22 MHz).

A composite video signal output of low pass filter 200 is applied to a phase splitter 230, providing respective oppositely phased versions of the composite video signal as outputs. The respective outputs are delivered to respective adders 240 and 260 for respective combinations with a common input signal, applied to the respective adders from the output terminal O of switching apparatus 80 via a delay device 250. The delay device 250 provides a signal delay of a time duration substantially matching the delay (e.g., 70 nanoseconds) introduced by low pass filter 200. Illustratively, the delay device 250 may comprise an all-pass network of a form shown in my copending application, Ser. No. 476,839, filed June 6, 1974, now abandoned, incorporating facile means for precision adjustment of the delay provided at the buried subcarrier frequency ($f_b$).

The poling of the phase splitter output delivered to adder 240 is such that its additive combination with the output of delay device 250 provides a comb filtering action of a type permitting luminance component passage (i.e., of a type providing a succession of rejection notches at odd multiples of half the line frequency ($f_H$) and an interleaved succession of response peaks at even multiples of half the line frequency). The comb filter thus realized provides a luminance component output (inclusive of deflection synchronizing components) free of the buried subcarrier chrominance component. However, the combing action extends below the shared midband, and thus eliminates luminance components in an unshared lowband (e.g., 0 – 1 MHz) including components desired for retention for adequate vertical detail rendition in reproduced images.

The opposite poling of the phase splitter output delivered to adder 260, however, is such that its additive combination with the output of delay device 250 results in a comb filtering action of a type complementary to that provided by adder 240, whereby components eliminated in the output of adder 240 are present in the output of adder 260. The output of adder 260 is applied to a low pass filter 270 having a cutoff frequency below the lowest buried subcarrier sideband component frequency, with an illustrative choice permitting passage of a vertical detail signal in a band of approximately 0 – 500 KHz while blocking passage of the buried subcarrier chrominance component.

The output of low pass filter 270 is applied to an adder 280 for additive combination with the output of adder 240. A delay device 290 (illustratively, of a coaxial line type such as is conventionally employed for luminance delay in color television receivers) is interposed in the coupling of the adder 240 output to a input of adder 280, with the signal delay introduced thereby chosen to substantially match the delay introduced by low pass filter 270 (illustratively, of the order of 600 nanoseconds).

The output of adder 280 comprises a luminance signal with restored vertical detail information, with the adding of the complementary comb filter outputs effectively providing a "filling in" of the luminance component combing over a low band determined by the passband of filter 270 (in the manner discussed, for example, in U.S. Pat. No. 2,729,698, issued to G. Fredendall). The output of adder 280 is supplied to a de-emphasis circuit 300 which provides a de-emphasis of luminance component high frequencies in a manner suitably complementary to the pre-emphasis thereof employed in the disc recording operation. The output of the de-emphasis circuit 300 is applied to a clamp circuit 310, which serves to restore the DC component of the luminance signal. Illustratively, the clamp circuit 310 is of the keyed clamp type, and keyed by periodic, line rate, keying pulses supplied to the keying pulse input terminal G, and time to coincide with periodic reference amplitude intervals of the luminance signal (e.g., during horizontal sync tip appearances).

The clamped output of circuit 310 forms the luminance component input to adder 320, which serves to add such input to the highband chrominance component output of bandpass filter 160 to develop an output composite color video signal of a form suitable for application to a color television receiver. Where such application is to be to the receiver's antenna terminals, the output of adder 320 may serve as the composite video signal input to trnsmitter apparatus of such a form, for example, as is shown in U.S. Pat. No. 3,775,555, issued to D. J. Carlson on Nov. 27, 1973.

The manner in which the luminance component for output use is formed at the output of adder 280 has a distinct advantage with respect to suppression of spurious low frequency luminance components which can be generated because of the rippled frequency response characteristic associated with delay lines of the relatively inexpensive glass type described as appropriate for delay line 170. Due to the presence of components in the output of such a delay line which represent multiple traversals of the delay line (e.g., a 3t component, resulting from three traversals), the delay line's frequency response characteristic departs from a desired flatness over its passband to a rippled shape (with the spacing between adjacent ripple peaks illustratively correponding to half the line frequency $f_H$). When carrier waves modulated in amplitude in accordance with a composite video signal are passed through such a delay line, the magnitude (and phase) of the carrier wave component passed by the delay will be dependent upon the precise location of the carrier frequency with respect to the peaks of the rippled frequency response characteristic of the delay line. However, as previously noted, the carrier frequency provided by the voltage controlled oscillator 100 varies in consonance with "jitter" of the frequencies of the composite video signal recovered during disc playback. As jitter thus moves the carrier frequency location with respect to the ripple peaks, the result is production of spurious components in the output of detector 190 at the relatively low frequencies of the jitter occurrence.

If such spurious low frequency components are retained in the luminance signal supplied to the color television receiver, undesirable streaking in the reproduced image can occur. The arrangement shown in the drawing, however, precludes the retention of the spurious components. Per the action of phase splitter 230, the spurious low frequency components appear in opposing phases in respective inputs to adders 240, 260, and are of such frequencies that they are passed in that relationship from both adders as inputs to adder 280. Cancellation of these spurious components then occurs in adder 280, provided there is an appropriate amplitude match for these components in the respective inputs to adder 290. An amplitude control may desirably be associated with the vertical detail path, for example, to facilitate arrival at the desired amplitude matching. It is observed that the amplitude adjustment providing optimum cancellation of the spurious low frequency components substantially corresponds to that required for correct vertical detail restoration.

The signal processing circuit arrangement heretofore described possesses a further advantage in facilitating use of an advantageous form of defect compensation system. In this regard, the filtered output of detector 190 serves an additional purpose beyond use for combing purposes. The detector output is coupled to the "substitution" signal input terminal S of switching apparatus 80, via a signal path including delay device 210 and a series, DC blocking, coupling element, such as the illustrated capacitor. The detector 190 output thus provides a delayed composite video signal for use as the input to amplitude modulator 90, when defect detection by detector 60 switches the video disc player into a defect masking mode of operation. Delay device 210 provides sufficient signal delay, in addition to the delay introduced by low pass filter 200, so that the sum of these delays substantially corresponds to a half-period at the buried subcarrier frequency. This assures, that in the defect masking mode of operation, rejection at the output subcarrier frequency ($f_o$) does not occur in the combiner 150, while rejection at the buried subcarrier frequency ($f_b$) does occur in adder 240 (as more fully explained in my aforesaid copending U.S. Pat. application, Ser. No. 476,839, now abandoned, and in an application, Ser. No. 568,313, forming a continuation-in-part thereof and filed concurrently herewith. The DC blocking element serves to prevent introduction of a spurious DC component during the defect masking mode, the spurious component arising from the aforesaid rippled nature of the delay line's frequency response characteristic and other player characteristics, as more fully explained in said continuation-in-part application.

It may be noted that in the arrangement illustrated herein, the chrominance comb filtering accuracy is stabilized against jitter while the luminance comb filtering is not. However, where, for example, the output of phase detector 130 is additionally used for "armstretcher" control purposes, as shown in the aforesaid Burrus application, the magnitude of the residual "jitter" is such as to render the lack of luminance combing stabilization tolerable.

It may also be noted that the delay suffered by the subcarrier component input to adder 320, due to the presence of band pass filter 160 in its path, is typically of the order of 500 nanoseconds, whereas the delay suffered by the low frequency portion of the luminance component input to adder 320, due to delay devices 250 and 290, is about 670 nanoseconds (for the illustrative delay examples). The difference in delay is of the appropriate sense and magnitude to substantially match delay difference requirements typically imposed on color TV broadcasters.

What is claimed is:

1. In a color image signal translating system comprising a source of an input composite video signal including a luminance signal occupying a wide band of frequencies, and a chrominance signal occupying only an intermediate portion of said wide band, the combination comprising:

a voltage controlled oscillator having an output of a frequency determined by a control voltage input;

means for modulating the output of said oscillator with said input composite signal to develop a modulated carrier output having a sideband in which said chrominance signal occupies an intermediate portion;

a 1H delay line;

means for applying said modulated carrier output to the input of said delay line;

first comb filter means responsive to modulated carrier waves derived from both the input and the output of said delay line;

means for deriving a chrominance signal, to the substantial exclusion of luminance signal components, from the output of said first comb filter means;

an amplitude modulation detector coupled to the output of said delay line for developing a delayed composite video signal;

a second comb filter means, response to an input composite video signal from said source and to a delayed composite video signal from said detector, for passing luminance signal components, to the substantial exclusion of said chrominance signal; and an adder for combining the outputs of said first and second comb filter means.

2. Apparatus in accordance with claim 1 also including:

a third comb filter means, responsive to an input composite video signal from said source, and to a delayed composite video signal from said detector opposite in phase to the delayed signal to which said second comb filter means is responsive;

a low pass filter, having a cut off frequency below said intermediate portion of said wide band, and coupled to receive the output of said third comb filter means; and means for applying the output of said low pass filter to said adder.

3. Apparatus in accordance with claim 2 also including:

means for rendering the control voltage input to said oscillator responsive to spurious variations of input composite signal frequencies.

4. Apparatus in accordance with claim 1 also including:

means for utilizing the output of said detector as a substitute input to said modulating means, in place of said input composite video signals, under conditions of defect presence in said input composite video signal.

* * * * *